(12) United States Patent
Kim (10) Patent No.: US 11,669,094 B2
(45) Date of Patent: Jun. 6, 2023

(54) APPARATUS AND METHOD FOR CONTROLLING MOTOR DRIVEN POWER STEERING SYSTEM

(71) Applicant: Hyundai Mobis Co., Ltd., Seoul (KR)

(72) Inventor: Tae Hong Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 324 days.

(21) Appl. No.: 17/076,367

(22) Filed: Oct. 21, 2020

(65) Prior Publication Data

US 2021/0382487 A1    Dec. 9, 2021

(30) Foreign Application Priority Data

Jun. 9, 2020  (KR) .................. 10-2020-0069500

(51) Int. Cl.
| | | |
|---|---|---|
| *G05D 1/02* | (2020.01) | |
| *B62D 5/04* | (2006.01) | |
| *G05D 1/00* | (2006.01) | |
| *B62D 6/00* | (2006.01) | |
| *B62D 15/02* | (2006.01) | |

(52) U.S. Cl.
CPC ......... *G05D 1/0212* (2013.01); *B62D 5/0493* (2013.01); *B62D 6/00* (2013.01); *B62D 15/02* (2013.01); *G05D 1/0088* (2013.01)

(58) Field of Classification Search
CPC .. G05D 1/0212; G05D 1/0088; B62D 5/0493; B62D 6/00; B62D 15/02; B62D 15/0265; B62D 5/046; B60W 30/09; B60W 50/00; B60W 60/00; B60W 2050/0021; B60W 2050/0022; B60W 2050/0055; B60W 2050/0056

USPC ....... 701/23, 26, 36; 340/465, 475, 539, 902
See application file for complete search history.

(56) References Cited

U.S. PATENT DOCUMENTS

| | | | | |
|---|---|---|---|---|
| 10,173,725 | B2 | 1/2019 | Heo | |
| 2007/0228713 | A1* | 10/2007 | Takemura | ............... B60R 22/46 |
| | | | | 297/216.13 |
| 2011/0241579 | A1* | 10/2011 | Kimpara | ................ B62D 5/046 |
| | | | | 318/400.02 |

(Continued)

FOREIGN PATENT DOCUMENTS

| | | |
|---|---|---|
| KR | 10-0247334 | 4/2000 |
| KR | 10-2015-0098987 | 8/2015 |

(Continued)

*Primary Examiner* — Elaine Gort
*Assistant Examiner* — Ellis B. Ramirez
(74) *Attorney, Agent, or Firm* — H.C. Park & Associates, PLC (57) ABSTRACT

An apparatus for controlling an MDPS system including: an autonomous driving cancellation determination unit configured to determine whether to cancel autonomous driving, using column torque passed through a band stop filter, under an autonomous driving condition; and a signal processing unit configured to calculate command steering angle acceleration information using command steering angle information outputted from an autonomous driving system. When the steering angle acceleration information is equal to or greater than a predetermined reference value, the autonomous driving cancellation determination unit may determine that urgent steering is performed by the autonomous driving system, and forbid cancellation of the autonomous driving.

17 Claims, 3 Drawing Sheets

(56) References Cited

U.S. PATENT DOCUMENTS

| | | | | |
|---|---|---|---|---|
| 2014/0156134 A1* | 6/2014 | Cullinane | ............... | B60R 22/48 |
| | | | | 701/23 |
| 2017/0203788 A1* | 7/2017 | Heo | ....................... | B62D 1/286 |
| 2018/0186406 A1* | 7/2018 | Itou | ...................... | B62D 5/0463 |
| 2019/0009816 A1* | 1/2019 | Moreillon | ................ | B62D 6/08 |
| 2020/0010111 A1* | 1/2020 | Tsubaki | ............... | B62D 5/0463 |
| 2020/0307642 A1* | 10/2020 | Tsuji | .................... | B60W 50/10 |

FOREIGN PATENT DOCUMENTS

| | | |
|---|---|---|
| KR | 10-2017-0085633 | 7/2017 |
| KR | 10-2019-0100482 | 8/2019 |

\* cited by examiner

* Examination of responsiveness according to input of step signal (input of 90-degree step and ramp down signals)

(a)

(b)

* Examination of responsiveness according to input of chirp signal (input of frequency signal of 1 to 40Hz)

10Hz or less (c)

10Hz or more (d)

APPARATUS AND METHOD FOR CONTROLLING MOTOR DRIVEN POWER STEERING SYSTEM

CROSS-REFERENCE TO RELATED APPLICATION

This application claims priority from and the benefit of Korean Patent Application No. 10-2020-0069500, filed on Jun. 9, 2020, which is hereby incorporated by reference for all purposes as if set forth herein.

BACKGROUND

Field

Exemplary embodiments relate to an apparatus and method for controlling an MDPS (Motor Driven Power Steering) system, and more particularly, to an apparatus and method for controlling an MDPS system, which can perform urgent steering while maintaining an autonomous driving mode in an emergency situation in which a risk of a collision or another accident suddenly occurs during autonomous driving of a vehicle.

Discussion of the Background

In general, a hydraulic power steering apparatus using hydraulic pressure of a hydraulic pump is used as a power assisted steering apparatus of a vehicle. After the 1990s, however, an MDPS system using an electronic motor has been universally used.

In the existing hydraulic power steering apparatus, the hydraulic pump serving as a power source to provide power is driven by an engine, and always consumes energy regardless of whether a steering wheel is turned. In the MDPS system, however, the motor driven by electric energy provides steering assist power when the steering wheel is turned to generate torque.

Therefore, when the MDPS system (or MDPS) is used, the energy efficiency of the vehicle can be improved further than when the hydraulic power steering apparatus is used.

A vehicle to which an autonomous driving mode according to the related art is applied has been designed to determine that autonomous driving is not normal, and cancel the autonomous driving, when the vehicle is urgently steered during the autonomous driving. This is because, in general, a condition in which the vehicle is urgently steered during the autonomous driving does not occur. When the vehicle is urgently steered, a dangerous situation may occur, in which a driver greatly leans in a direction opposite to the steering direction of the vehicle. However, when an urgent avoiding operation is required to prevent an accident, the autonomous driving mode may be retained so that the vehicle is urgently steered.

In other words, when the risk of a collision or another accident suddenly occurs during autonomous driving, the vehicle to which the autonomous driving mode is applied needs to be designed to avoid the accident risk by reducing vehicle velocity or controlling steering. However, the vehicle to which the existing autonomous driving mode is applied is only designed to cope with a typical situation in which an obstacle is detected in advance at a designated distance, but not designed to cope with an emergency situation (e.g. a situation in which a pedestrian or another vehicle suddenly appears ahead of the vehicle).

Therefore, in case of a non-emergency situation, it is typically effective to reduce the vehicle velocity in advance. However, in case of an emergency situation (e.g. a situation in which a pedestrian or another vehicle suddenly appears ahead of the vehicle), it may be more effective to urgently steer the vehicle, in order to avoid an accident. However, when the autonomous driving mode is canceled or abnormally performed in such an emergency situation as in the vehicle to which the existing autonomous driving mode is applied, the driver (or user) may be placed in a more dangerous situation. Therefore, there is a need for technology capable of maximizing responsiveness such that a vehicle can be momentarily and quickly steered in response to an emergency situation, while the autonomous driving mode is continuously retained.

The related art of the present disclosure is disclosed in Korean Patent No. 10-0247334 registered on Dec. 10, 1999 and entitled "Motor Driven Power Steering Device".

The above information disclosed in this Background section is only for enhancement of understanding of the background of the invention and, therefore, it may contain information that does not constitute prior art.

SUMMARY

Exemplary embodiments of the present invention provide an apparatus and method for controlling an MDPS system, which can perform urgent steering while maintaining an autonomous driving mode in an emergency situation in which a risk of a collision or another accident suddenly occurs during autonomous driving of a vehicle.

Additional features of the invention will be set forth in the description which follows, and in part will be apparent from the description, or may be learned by practice of the invention.

An exemplary embodiment of the present invention provides an apparatus for controlling an MDPS system including: an autonomous driving cancellation determination unit configured to determine whether to cancel autonomous driving, using column torque passed through a band stop filter, under an autonomous driving condition; and a signal processing unit configured to calculate command steering angle acceleration information using command steering angle information outputted from an autonomous driving system. When the steering angle acceleration information is equal to or greater than a predetermined reference value, the autonomous driving cancellation determination unit may determine that urgent steering is performed by the autonomous driving system, and forbid cancellation of the autonomous driving.

The band stop filter may be a filter for removing a frequency component of column torque which is generated in case of unintended steering intervention of a user.

The frequency component which is generated in case of the unintended steering intervention of the user may be the same vibration frequency as the resonant point of a torsion bar of the MDPS system within an error range.

The autonomous driving cancellation determination unit may remove a frequency component of column torque which is generated in case of unintended steering intervention of a user, through the band stop filter, and forbid the cancellation of the autonomous driving even though the unintended steering intervention of the user occurs.

The autonomous driving cancellation determination unit may cancel the autonomous driving when a command steering angle applied from the autonomous driving system equal to or more than the maximum steering angle designated based on a geometric characteristic of a vehicle, and cancel the autonomous driving even when a steering angular velocity equal to or greater than a designated reference value is inputted.

The urgent steering by the autonomous driving system may indicate that the column torque may be significantly increased to a predetermined reference value or more as a torsion bar is momentarily and rapidly distorted by steering through the autonomous driving system.

The signal processing unit may include: a first differentiator and a second differentiator configured to calculate steering angle acceleration by differentiating the command steering angle, outputted from the autonomous driving system, two times in a row; and an LPF (Low Pass Filter) configured to process and correct noise from the calculated steering angle acceleration.

The signal processing unit may further include: a gain adjusting unit configured to improve momentary gain responsiveness by increasing a gain of a steering angle position controller, in case of urgent steering by the autonomous driving system; and a variable HPF (High Pass Filter) configured to monitor a position control error of the steering angle position controller, change an urgent steering autonomous driving mode to a general autonomous driving mode when a current steering angle reaches a desired command steering angle, and adjust a cut-off frequency and gain to a cut-off frequency and gain which correspond to the general autonomous driving mode.

The position control error may indicate a value corresponding to a difference between the command steering angle and the current steering angle.

The variable HPF may lower the cut-off frequency to increase the gain and frequency response in case of urgent steering by the autonomous driving system, and raise the cut-off frequency to lower the gain and frequency response in other cases except the urgent steering by the autonomous driving system.

The variable HPF may receive a position control error corresponding to a difference between the current steering angle and the command steering angle, decide a cut-off frequency according to a command steering angular velocity, raise the cut-off frequency by lowering a differentiation time as a vehicle velocity is high, and lower the cut-off frequency by raising the differentiation time as the vehicle velocity is low.

The apparatus may further include a vibration detection unit configured to monitor in real time how frequently the sign of the steering angular velocity is changed for a predetermined time period, in order to prevent an increase in gain of the steering angle position controller by vibration caused by an external environment factor or a variation in cut-off frequency of the variable HPF, in case of urgent steering by the autonomous driving system. When a vibration magnitude equal to or greater than a designated reference value is detected by the vibration detection unit, the variable HPF may change the urgent steering autonomous driving mode to the general autonomous driving mode, and adjust a cut-off frequency and gain to a cut-off frequency and gain which correspond to the general autonomous driving mode.

Another exemplary embodiment of the present invention provides a method for controlling an MDPS system including: calculating, by a signal processing unit of the MDPS system, command steering angle acceleration information using command steering angle information outputted from an autonomous driving system; and determining, by an autonomous driving cancellation determination unit, that urgent steering is performed by the autonomous driving system, and forbidding cancellation of the autonomous driving, when the steering angle acceleration information is equal to or more than a predetermined reference value.

The method may further include determining, by the autonomous driving cancellation determination unit, whether to cancel autonomous driving, using column torque passed through a band stop filter, under an autonomous driving condition. The band stop filter may be a filter for removing a frequency component of column torque which is generated in case of unintended steering intervention of a user.

The frequency component which is generated in case of the unintended steering intervention of the user may be the same vibration frequency as the resonant point of a torsion bar of the MDPS system within an error range.

The autonomous driving cancellation determination unit may remove a frequency component of column torque which is generated in case of unintended steering intervention of a user, through the band stop filter, and forbid the cancellation of the autonomous driving even though the unintended steering intervention of the user occurs.

The autonomous driving cancellation determination unit may cancel the autonomous driving when a command steering angle applied from the autonomous driving system is equal to or more than the maximum steering angle designated based on a geometric characteristic of a vehicle, and cancel the autonomous driving even when a steering angular velocity equal to or greater than a designated reference value is inputted.

The urgent steering by the autonomous driving system may indicate that the column torque is significantly increased to a predetermined reference value or more as a torsion bar is momentarily and rapidly distorted by steering through the autonomous driving system.

In the calculating of the command steering angle acceleration information using the command steering angle information outputted from the autonomous driving system, the signal processing unit may include: a first differentiator and a second differentiator configured to calculate steering angle acceleration by differentiating the command steering angle, outputted from the autonomous driving system, two times in a row; and an LPF configured to process and correct noise from the calculated steering angle acceleration.

The method may further include, in case of urgent steering by the autonomous driving system: improving, by a gain adjusting unit, momentary gain responsiveness by increasing a gain of a steering angle position controller; and monitoring, by a variable HPF, a position control error of the steering angle position controller, changing an urgent steering autonomous driving mode to a general autonomous driving mode when a current steering angle reaches a desired command steering angle, and adjusting a cut-off frequency and gain to a cut-off frequency and gain which correspond to the general autonomous driving mode.

The position control error may indicate a value corresponding to a difference between the command steering angle and the current steering angle.

In the adjusting of the cut-off frequency and the gain, the variable HPF may lower the cut-off frequency to increase a gain and frequency response in case of urgent steering by the autonomous driving system, and raise the cut-off frequency to lower the gain and frequency response in other cases except the urgent steering by the autonomous driving system.

In the adjusting of the cut-off frequency and the gain, the variable HPF may receive a position control error corresponding to a difference between the current steering angle and the command steering angle, decide a cut-off frequency according to a command steering angular velocity, raise the cut-off frequency by lowering a differentiation time as a vehicle velocity is high, and lower the cut-off frequency by raising the differentiation time as the vehicle velocity is low.

The method may further include monitoring, by a vibration detection unit, in real time how frequently the sign of the steering angular velocity is changed for a predetermined time period, in order to prevent an increase in gain of the steering angle position controller by vibration caused by an external environment factor or a variation in cut-off frequency of the variable HPF, in case of urgent steering by the autonomous driving system. When a vibration magnitude equal to or greater than a designated reference value is detected by the vibration detection unit, the variable HPF may change the urgent steering autonomous driving mode to the general autonomous driving mode, and adjust a cut-off frequency and gain to a cut-off frequency and gain which correspond to the general autonomous driving mode.

In accordance with the embodiments of the present disclosure, the apparatus and method for controlling an MDPS system can perform urgent steering while maintaining an autonomous driving mode in an emergency situation in which a risk of a collision or another accident suddenly occurs during autonomous driving of a vehicle, thereby avoiding an accident.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an apparatus and method for controlling an MDPS (Motor Driven Power Steering) system will be described below with reference to the accompanying drawings through various exemplary embodiments.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
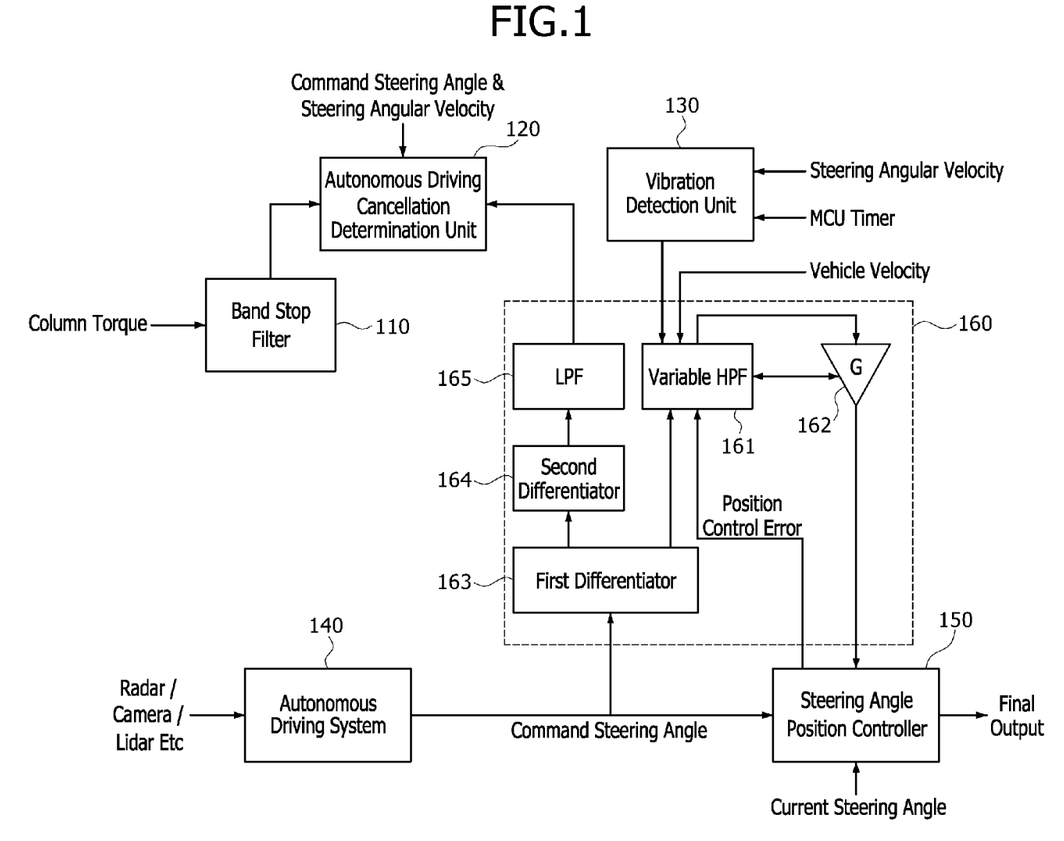
FIG. 1 is a diagram illustrating a schematic configuration of an apparatus for controlling an MDPS system in accordance with an embodiment of the present disclosure.

FIG. 1 is a diagram illustrating a schematic configuration of an apparatus for controlling an MDPS system in accordance with an embodiment of the present disclosure.

As illustrated in FIG. 1, the apparatus for controlling an MDPS system in accordance with the embodiment of the present disclosure includes a band stop filter 110, an autonomous driving cancellation determination unit 120, a vibration detection unit 130, an autonomous driving system 140, a steering angle position controller 150 and a signal processing unit 160. The signal processing unit 160 includes a variable HPF (High Pass Filter) 161, a gain adjusting unit 162, a first differentiator 163, a second differentiator 164 and an LPF (Low Pass Filter) 165.

The autonomous driving cancellation determination unit 120 determines whether to cancel autonomous driving, using a signal obtained by passing column torque through the band stop filter 110, under other general autonomous driving conditions except a predefined emergency condition (e.g. a collision avoidance condition by urgent steering of an autonomous driving system).

For example, in case of unintended steering intervention of a user (i.e. vibration caused by a steering wheel touched by the user, not a steering operation), vibration similar to the resonance point of a torsion bar of the MDPS system (i.e. the same vibration frequency within an error range) may be caused. In this case, the autonomous driving cancellation determination unit 120 removes the a frequency component of column torque (i.e. the frequency component caused by the unintended steering intervention of the user) by filtering the vibration through the band stop filter 110. Through this operation, the autonomous driving cancellation determination unit 120 does not cancel the autonomous driving even though unintended steering intervention of the user occurs.

The autonomous driving cancellation determination unit 120 receives a command steering angle and steering angular velocity information, and determines whether to cancel the autonomous driving.

For example, the autonomous driving cancellation determination unit 120 cancels the autonomous driving when a command steering angle equal to or higher than the maximum steering angle based on the geometric characteristics of the vehicle is applied from the autonomous driving system 140. Furthermore, the autonomous driving cancellation determination unit 120 cancels the autonomous driving, when the steering angular velocity corresponds to a condition in which it is difficult for a driver to have a comfortable ride or a level at which it is impossible to perform control (i.e. when a steering angular velocity equal to or more than a reference value is inputted) during the autonomous driving.

For reference, the condition in which the autonomous driving cancellation determination unit 120 cancels the autonomous driving corresponds to a condition in which the driver safely uses autonomous driving under a general autonomous driving condition, except for a designated emergency condition (e.g. a collision avoidance condition caused by urgent steering of the autonomous driving system). This condition may be changed according to the geometric characteristic of the vehicle. That is, since lateral acceleration or the magnitude and change rate of a yaw rate may be changed according to the length and weight of the vehicle and a turning angle characteristic based on a gear ratio, the condition is tuned in consideration of characteristics for each vehicle and stored in an internal memory (not illustrated).

As described above, however, when the vehicle cannot avoid a collision even though the vehicle velocity is reduced as an obstacle suddenly appears, it is necessary to avoid a collision through urgent steering (or emergency steering).

In this case, when emergency steering is performed by the autonomous driving system 140, the torsion bar is momentarily and rapidly distorted to significantly increase the column torque. Thus, in the related art, the autonomous driving cancellation determination unit 120 may determine that the emergency steering was intended by the driver, and thus cancel the autonomous driving.

However, this condition (i.e. the emergency steering by the autonomous driving system) does not correspond to a predetermined general autonomous driving condition.

Therefore, the autonomous driving may be canceled according to the existing autonomous driving cancellation condition in which the autonomous driving is canceled when the column torque is equal to or more than a predetermined level.

That is, in order to avoid an obstacle, the autonomous driving system 140 may issue an urgent steering command to increase the column torque. In this case, when the autonomous driving cancellation determination unit 120 erroneously determines that the column torque was increased by steering intervention intended by the user and cancels the autonomous driving, the vehicle may not avoid an obstacle, but collide with the obstacle.

In order to prevent the autonomous driving cancellation determination unit 120 from erroneously determining that the urgent steering is steering intervention of the user in case of the urgent steering by the autonomous driving system, command steering angle acceleration information needs to be calculated through command steering angle information outputted by the autonomous driving system 140.

In general, since rotational torque is proportional to the product of rotational inertia moment and steering angle acceleration, it may be expected that the rotational torque will increase when the command steering angle acceleration is equal to or more than a designated reference value. Therefore, the steering angle acceleration is calculated by differentiating the command steering angle outputted from the autonomous driving system 140 through the first and second differentiators 163 and 164 two times, and noise generated at this time is processed and corrected through the LPF 165. When the steering angle acceleration value corrected and outputted through the LPF 165 is equal to or more than a designated reference value, the autonomous driving cancellation determination unit 120 forbids the cancellation of the autonomous driving.

For reference, the magnitude of the steering angle acceleration for forbidding the cancellation of the autonomous driving indicates a momentary change in turning angle of the vehicle, and does not need to be changed according to the characteristic of the vehicle. Thus, reference steering angle acceleration may be decided through a test and applied to a memory (not illustrated), and then used for all kinds of vehicles.

Figure 3:
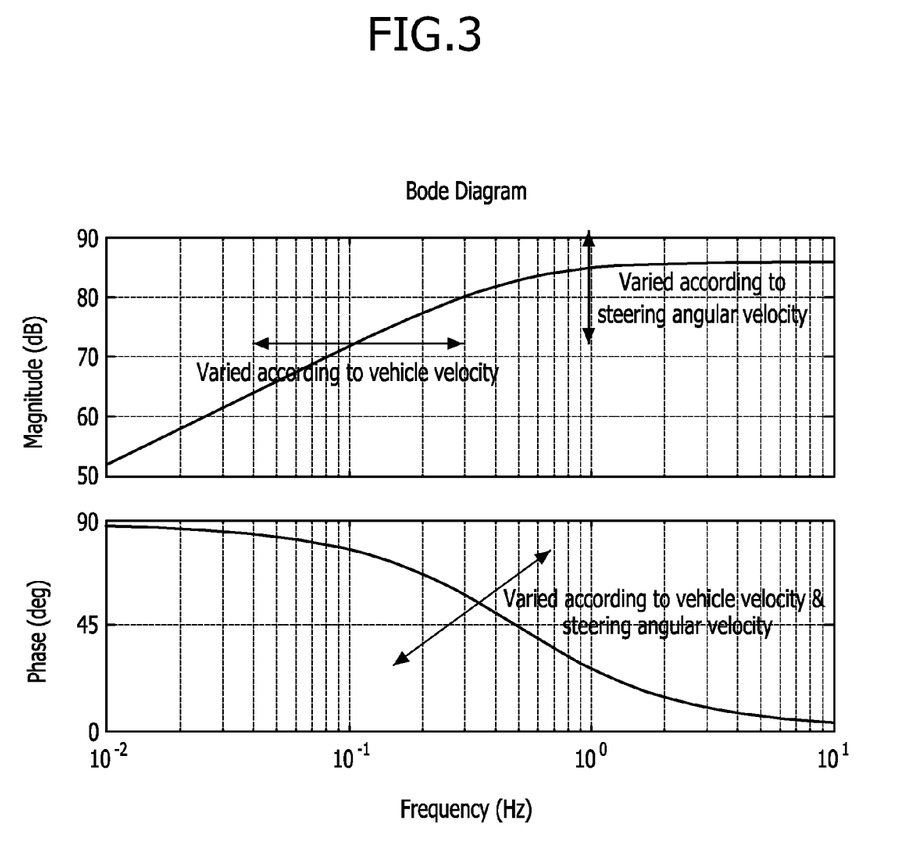
FIG. 3 is a diagram for promoting understandings of characteristics of a variable HPF (High Pass Filter) in FIG. 1.

Furthermore, when an urgent steering command is inputted from the autonomous driving system 140, the autonomous driving cancellation determination unit 120 may prevent the cancellation of the autonomous driving. Based on the vehicle velocity and the steering angle acceleration generated at this time, the performance of the steering angle position controller 150 may be varied through the variable HPF 161 and the gain adjusting unit 162 as illustrated in FIG. 3.

Typically, the road load of the vehicle is decreased when the vehicle velocity is high. On the other hand, the road load of the vehicle is increased when the vehicle velocity is low, and a high output is required during steering. Furthermore, a high output is needed as the steering angular velocity is high, and a low output is needed as the steering angular velocity is low. As the vehicle velocity is low, the cut-off frequency of the variable HPF 161 may be lowered to cope with a wide bandwidth. As the vehicle velocity is high, the cut-off frequency of the variable HPF 161 may be raised to cope with a narrow bandwidth. This is because, as the vehicle velocity is high, the control stability of the MDPS system may be degraded by road noise or noise of a mechanism or tire.

Furthermore, the gain adjusting unit 162 increases a gain G as the steering angular velocity is high, and decreases the gain G as the steering angular velocity is low. Thus, when urgent steering is required, the gain G is increased to significantly raise momentary gain responsiveness.

The variable HPF 161 monitors a position control error (i.e. command steering angle—current steering angle) of the steering angle position controller 150. When the current steering angle reaches a desired command steering angle, the variable HPF 161 returns an urgent steering autonomous driving mode setting value to a general autonomous driving mode setting value (e.g. the cut-off frequency and the gain G).

For reference, the control characteristic of the steering angle position controller 150, which is improved by applying the variable HPF 161, is described as follows.

In general, a D controller (differentiation controller) is added to the steering angle position controller 150 in order to raise responsiveness to a change in position. In this case, however, noise generated by disturbance or introduced from an external environment may be amplified to cause vibration, and the performance of the steering angle position controller 150 may be degraded. In order to prevent the degradation in performance, an LPF or a lag compensator is generally applied to the previous stage of the D controller. However, when the structure becomes complex and needs to be varied according to a steering situation, the number of parameters or factors to be changed is increased. That is, in a general P-PI configuration of the steering angle position controller 150, a P controller stage is designed as PI or PID, and a PI-PI or PID-PI configuration is used. Thus, there is a need for a more effective method which can maximize the performance of the controller according to a steering situation, and significantly increase responsiveness while being resistant to noise or disturbance.

Therefore, when an LPF or lag compensator is typically applied as the D controller (or differentiation controller) in a PID controller (or proportional differentiation integration controller), the following equation may be established: $G(s)=Kp(1+1/Ti*s+Td*s/(1+s*Td))$. When the PID control gain is separated to rearrange the equation or the gain is separated so that Kp is suitable for the I or D controller, the equation may be expressed as $G(s)=kp+Ki/Ti*s+Kd*s/(1+Td*s)$. At this time, for the D controller, the equation may be rearranged as $(1/Td)/((1/Td)+s))*Td*Kp*s$.

That is, when a lag compensator or LPF is not applied as the D controller, but a specialized D control gain is set and an HPF is applied, a structure resistant to noise or disturbance can be made while responsiveness is raised. Here, Ti and Td represent control times for the respective controllers, where Ti represents an integration time, and Td represents a differentiation time.

Thus, in the present embodiment, when a command steering velocity inputted to the steering angle position controller 150 is high, the cut-off frequency of the variable HPF 161 is lowered according to the above-described control characteristic. That is, frequency response and a necessary gain of a steering region are raised. On the other hand, when the command steering velocity is low, the cut-off frequency of the HPF 161 is raised. That is, the frequency response and the necessary gain of the steering region are lowered to make the structure insensitive to noise, such that the structure does not react to vibration or disturbance.

Therefore, it is possible to effectively and actively perform position control, when a collision needs to be avoided by urgent steering during autonomous driving.

When the control response is continuously raised even after the urgent steering has been completed, disturbance or noise is amplified to degrade the performance of the position control during general driving. However, when urgent steering control is required as in the present embodiment, such control is required to improve the safety of the driver.

That is, the variable HPF 161 receives an error value (i.e. position control error) corresponding to a difference between a current steering angle and a command steering angle, the cut-off frequency is decided according to a command steering angular velocity, and the gain G of the gain adjusting unit 162 is calculated by multiplying the position control gain Kp ($G=Kp*Td$) by the differentiation time Td.

Here, Kp represents a P gain of the PID controller.

For reference, since the differentiation time Td may define the control period and frequency of the D controller in the PID controller, the value of Kd is varied to control the gain G.

Here, Kd represents a D gain of the PID controller.

As already defined, the value of Kd is increased as the steering angular velocity is high within a transfer function, and decreased as the steering angular velocity is low. Thus, the gain response characteristic of the controller is varied. Furthermore, as described above, a specific portion (i.e. $(1/Td)+s)$, $*s$) in the transfer function of $((1/Td)/((1/Td)+s))*Td*Kp*s)$ has the same form as the HPF, and can be set to a desired frequency through $1/Td$.

That is, a transfer function of a general HPF may be expressed as $s/(s+w)$. Here, $w$ is $2*pi*f$, where f represents a cut-off frequency.

In the transfer function, $1/Td$ becomes w, and the value of Td is varied to set a desired frequency.

That is, since external noise or tire vibration is increased as the vehicle velocity increases, the cut-off frequency may be lagged (or increased) when the value of the differentiation time Td is lowered (or decreased). Furthermore, when the value of the differentiation time Td is raised (or increased) as the vehicle velocity is low, the cut-off frequency may be lowered to control a wider bandwidth. This is decided through a test in consideration of the control stability of the MDPS, and the values of the gain G and the differentiation time Td are stored in a tuning map according to the vehicle velocity and the steering angular velocity.

However, when urgent steering is performed during the autonomous driving, vibration or the like may be caused by a factor such as the external environment. In this case, the vibration needs to be detected in advance in order to prevent an excessive increase in gain G or a vibration in cut-off frequency of the variable HPF 161.

Figure 2:
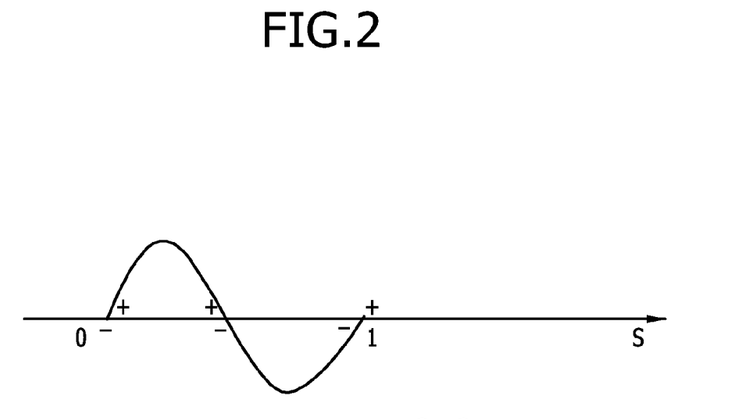
FIG. 2 is a diagram for describing a method in which a vibration detection unit monitors a change in sign of a steering angular velocity, in FIG. 1.

For this operation, the vibration detection unit 130 monitors in real time how frequently the sign of the steering angular velocity is changed for a predetermined time period (see FIG. 2).

For example, when the sign of the steering angular velocity is changed a total of three times for a count time of one second as illustrated in FIG. 2, it may be determined that a noise of 1 Hz occurred.

Typically, since the stiffness of the torsion bar is the lowest in the MDPS system, vibration occurs most frequently at the resonant frequency of the torsion bar. The resonant frequency ranges from 8 to 12 Hz. For example, it can be assumed that a vibration of 8 Hz occurs when the sign of the steering angular velocity is changed 17 times per second. This may indicate that the gain G has been excessively increased or the cut-off frequency of the variable HPF 161 has been excessively lowered. Therefore, the value of the gain G or the cut-off frequency is returned to the value of the gain G or the cut-off frequency under the predetermined general autonomous driving condition.

In order to prevent the resonance of the MDPS system when the MDPS system performs position control in a normal situation during autonomous driving, the steering angle position controller 150 is designed, and the PID gain is tuned. However, when the performance of the steering angle position controller 150 is maximized to momentarily avoid an obstacle, that is, when the gain G is momentarily raised or the cut-off frequency of the variable HPF 161 is lowered to a range of 8 to 12 Hz, the gain may be increased according to the frequency characteristic. Thus, the stability of the steering angle position controller 150 may be degraded to cause vibration. In general, the torsion bar resonant frequency of 8 to 12 Hz is not detected in the MDPS system. When a signal of the corresponding frequency is detected by the vibration detection unit 130, the gain G may be lowered, or the cut-off frequency of the variable HPF 161 may be returned to a level corresponding to a normal condition in which no vibration occurs.

In other words, when the gain G of the steering angle position controller 150 is raised to increase momentary responsiveness or the cut-off frequency is adjusted to increase the gain characteristic of a frequency at which momentary steering is required (in general, as the cut-off frequency of the variable HPF 161 is lowered, the gain level according to the frequency of 8 to 12 Hz is increased), a safety margin of the steering angle position controller 150 is reduced. When the vibration detection unit 130 monitors the reduction in safety margin and determines that vibration occurs, the performance of the steering angle position controller 150 is returned to the normal state.

Through this operation, the cancellation of the autonomous driving may be forbidden in case of an urgent steering situation, and the performance of the steering angle position controller 150 may be maximized through the variable HPF 161, such that the autonomous vehicle can avoid an obstacle in an urgent situation. Furthermore, the cut-off frequency of the variable HPF 161, varied by a position control error, is returned according to a general autonomous situation. When vibration occurred according to a situation during urgent steering, the variable HPF 151 may be optimized to prevent a side effect caused by the urgent steering.

Figure 4:
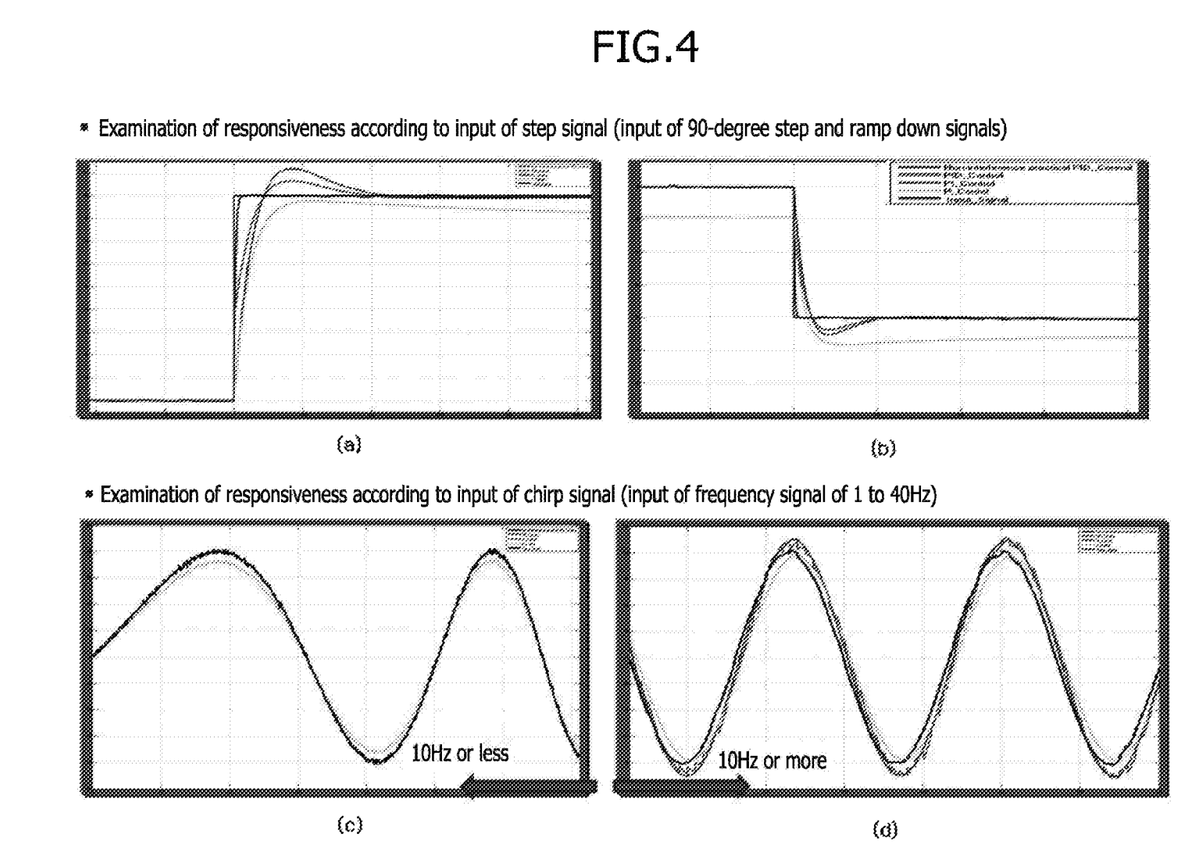
FIG. 4 is a diagram illustrating responsiveness according to an experiment result of a steering angle location controller in FIG. 1, compared to the related art.

Therefore, as illustrated in FIGS. 4A to 4D, an experiment result of the steering angle position controller in accordance with the present embodiment shows that responsiveness (blue signal) according to an input (black signal) of a step signal (e.g. a signal corresponding to urgent steering) as a command steering angle has been improved more than other existing position controllers (red, yellowish green and brown signals) as illustrated in FIGS. 4A and 4B. Furthermore, the experiment result shows that responsiveness (blue signal) according to an input (black signal) (e.g. a signal corresponding to general steering except sudden steering) of a chirp signal (e.g. a signal corresponding to general steering except urgent steering) as a command steering angle has also been improved more than the other existing position controllers (red, yellowish green and brown signals) as illustrated in FIGS. 4C and 4D.

In the present embodiment, when the vehicle intends to avoid an obstacle which suddenly appears during autonomous driving, the vehicle may not sufficiently cope with such a situation only through deceleration. In this case, urgent steering is performed. When urgent steering is performed, the autonomous driving may be cancelled. That is, when urgent steering is performed, signals such as high steering velocity, acceleration, non-linear steering command and column torque increase, which are not generated in a general autonomous driving situation, are applied to the MDPS system. When it is determined that signals which are not generated in a general autonomous driving situation are applied to the MDPS system, the performance of the position controller may be momentarily maximized to quickly and accurately perform the urgent steering command without canceling the autonomous driving, which makes it possible to stably and urgently avoid an obstacle at a dangerous moment.

Although the present disclosure has been disclosed with reference to the embodiments illustrated in the drawings, the embodiments are only for illustrative purposes, and those skilled in the art will appreciate that various modifications and other equivalent embodiments therefrom are possible. Thus, the true technical scope of the present disclosure should be defined by the following claims. Furthermore, the embodiments described in this specification may be implemented with a method or process, a device, a software program, a data stream or a signal, for example. Although a feature is discussed only in the context of single implementation (for example, discussed only in a method), the discussed feature can be is implemented in another type (for example, apparatus or program). An apparatus may be implemented in suitable hardware, software or firmware. The method can be implemented in a device such as a processor which generally refers to a processing device including a computer, a microprocessor, an integrated circuit or a programmable logic device. The processor includes a communication device, such as a computer, a cell phone, a PDA (Personal Digital Assistant) and another device, which can facilitate information communication between end users.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An apparatus for controlling a Motor Driven Power Steering (MDPS) system, comprising:
   an autonomous driving cancellation determination unit configured to determine whether to cancel autonomous driving, using column torque passed through a band stop filter, under an autonomous driving condition; and
   a signal processing unit configured to calculate command steering angle acceleration information using command steering angle information outputted from an autonomous driving system,
   wherein:
   when the steering angle acceleration information is equal to or greater than a predetermined reference value, the autonomous driving cancellation determination unit determines that urgent steering is performed by the autonomous driving system, and forbids cancellation of the autonomous driving;
   the signal processing unit comprises:
      a first differentiator and a second differentiator configured to calculate steering angle acceleration by differentiating the command steering angle, outputted from the autonomous driving system, two times in a row;
      an LPF (Low Pass Filter) configured to process and correct noise from the calculated steering angle acceleration;
      a gain adjusting unit configured to improve momentary gain responsiveness by increasing a gain of a steering angle position controller, in case of urgent steering by the autonomous driving system; and
      a variable HPF (High Pass Filter) configured to monitor a position control error of the steering angle position controller, change an urgent steering autonomous driving mode to a general autonomous driving mode when a current steering angle reaches a desired command steering angle, and adjust a cut-off frequency and gain to a cut-off frequency and gain which correspond to the general autonomous driving mode.

2. The apparatus of claim 1, wherein:
   the band stop filter is a filter for removing a frequency component of column torque which is generated in case of unintended steering intervention of a user; and
   the frequency component which is generated in case of the unintended steering intervention of the user is the same vibration frequency as the resonant point of a torsion bar of the MDPS system within an error range.

3. The apparatus of claim 1, wherein the autonomous driving cancellation determination unit removes a frequency component of column torque which is generated in case of unintended steering intervention of a user, through the band stop filter, and forbids the cancellation of the autonomous driving even though the unintended steering intervention of the user occurs.

4. The apparatus of claim 1, wherein the autonomous driving cancellation determination unit cancels the autonomous driving when a command steering angle applied from the autonomous driving system is equal to or greater than the maximum steering angle designated based on a geometric characteristic of a vehicle, and cancels the autonomous driving even when a steering angular velocity equal to or greater than a designated reference value is inputted.

5. The apparatus of claim 1, wherein the urgent steering by the autonomous driving system indicates that the column torque is significantly increased to a predetermined reference value or more as a torsion bar is momentarily and rapidly distorted by steering through the autonomous driving system.

6. The apparatus of claim 1, wherein the variable HPF lowers the cut-off frequency to increase the gain and frequency response in case of urgent steering by the autonomous driving system, and raises the cut-off frequency to lower the gain and frequency response in other cases except the urgent steering by the autonomous driving system.

7. The apparatus of claim 1, wherein the variable HPF receives a position control error corresponding to a difference between the current steering angle and the command steering angle, decides a cut-off frequency according to a command steering angular velocity, raises the cut-off frequency by lowering a differentiation time as a vehicle velocity is high, and lowers the cut-off frequency by raising the differentiation time as the vehicle velocity is low.

8. The apparatus of claim 1, further comprising a vibration detection unit configured to monitor, in real time, how frequently the sign of the steering angular velocity is changed for a predetermined time period, in order to prevent an increase in gain of the steering angle position controller by vibration caused by an external environment factor or a variation in cut-off frequency of the variable HPF, in case of urgent steering by the autonomous driving system, wherein, when a vibration magnitude equal to or greater than a designated reference value is detected by the vibration detection unit, the variable HPF changes the urgent steering autonomous driving mode to the general autonomous driving mode, and adjusts a cut-off frequency and gain to a cut-off frequency and gain which correspond to the general autonomous driving mode.

9. A method for controlling a Motor Driven Power Steering (MDPS) system, comprising:

calculating, by a signal processing unit of the MDPS system, command steering angle acceleration information using command steering angle information outputted from an autonomous driving system; and determining, by an autonomous driving cancellation determination unit, that urgent steering is performed by the autonomous driving system, and forbidding cancellation of the autonomous driving, when the steering angle acceleration information is equal to or more than a predetermined reference value, wherein, in case of urgent steering by the autonomous driving system, the method further comprises:

improving, by a gain adjusting unit, momentary gain responsiveness by increasing a gain of a steering angle position controller; and monitoring, by a variable HPF, a position control error of the steering angle position controller, changing an urgent steering autonomous driving mode to a general autonomous driving mode when a current steering angle reaches a desired command steering angle, and adjusting a cut-off frequency and gain to a cut-off frequency and gain which correspond to the general autonomous driving mode.

10. The method of claim 9, further comprising determining, by the autonomous driving cancellation determination unit, whether to cancel autonomous driving, using column torque passed through a band stop filter, under an autonomous driving condition, wherein:
the band stop filter is a filter for removing a frequency component of column torque which is generated in case of unintended steering intervention of a user; and
the frequency component which is generated in case of the unintended steering intervention of the user is the same vibration frequency as the resonant point of a torsion bar of the MDPS system within an error range.

11. The method of claim 9, wherein the autonomous driving cancellation determination unit removes a frequency component of column torque which is generated in case of unintended steering intervention of a user, through the band stop filter, and forbids the cancellation of the autonomous driving even though the unintended steering intervention of the user occurs.

12. The method of claim 9, wherein the autonomous driving cancellation determination unit cancels the autonomous driving when a command steering angle applied from the autonomous driving system is equal to or greater than the maximum steering angle designated based on a geometric characteristic of a vehicle, and cancels the autonomous driving even when a steering angular velocity equal to or greater than a designated reference value is inputted.

13. The method of claim 9, wherein the urgent steering by the autonomous driving system indicates that the column torque is significantly increased to a predetermined reference value or more as a torsion bar is momentarily and rapidly distorted by steering through the autonomous driving system.

14. The method of claim 9, wherein, in the calculating of the command steering angle acceleration information using the command steering angle information outputted from the autonomous driving system, the signal processing unit comprises:
a first differentiator and a second differentiator configured to calculate steering angle acceleration by differentiating the command steering angle, outputted from the autonomous driving system, two times in a row; and
an LPF (Low Pass Filter) configured to process and correct noise from the calculated steering angle acceleration.

15. The method of claim 9, wherein in the adjusting of the cut-off frequency and the gain, the variable HPF lowers the cut-off frequency to increase a gain and frequency response in case of urgent steering by the autonomous driving system, and raises the cut-off frequency to lower the gain and frequency response in other cases except the urgent steering by the autonomous driving system.

16. The method of claim 9, wherein in the adjusting of the cut-off frequency and the gain, the variable HPF receives a position control error corresponding to a difference between the current steering angle and the command steering angle, decides a cut-off frequency according to a command steering angular velocity, raises the cut-off frequency by lowering a differentiation time as a vehicle velocity is high, and lowers the cut-off frequency by raising the differentiation time as the vehicle velocity is low.

17. The method of claim 9, further comprising monitoring, by a vibration detection unit, in real time, how frequently the sign of the steering angular velocity is changed for a predetermined time period, in order to prevent an increase in gain of the steering angle position controller by vibration caused by an external environment factor or a variation in cut-off frequency of the variable HPF, in case of urgent steering by the autonomous driving system,     wherein, when a vibration magnitude equal to or greater than a designated reference value is detected by the vibration detection unit, the variable HPF changes the urgent steering autonomous driving mode to the general autonomous driving mode, and adjusts a cut-off frequency and gain to a cut-off frequency and gain which correspond to the general autonomous driving mode.

\* \* \* \* \*